(12) United States Patent
Sauder et al.

(10) Patent No.: US 6,779,072 B1
(45) Date of Patent: Aug. 17, 2004

(54) METHOD AND APPARATUS FOR ACCESSING MMR REGISTERS DISTRIBUTED ACROSS A LARGE ASIC

(75) Inventors: Mark F. Sauder, Chippewa Falls, WI (US); Michael L. Anderson, Eau Claire, WI (US); Eric C. Fromm, Eau Claire, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 221 days.

(21) Appl. No.: 09/619,722

(22) Filed: Jul. 20, 2000

(51) Int. Cl.[7] ............................................... G06F 12/00
(52) U.S. Cl. ........................................... 711/1; 711/202
(58) Field of Search ............................. 711/1, 202, 157

(56) References Cited

U.S. PATENT DOCUMENTS

| | | | |
|---|---|---|---|
| 4,477,713 A | 10/1984 | Cook et al. ............ 219/124.34 |
| 4,514,749 A | 4/1985 | Shoji ........................... 357/68 |
| 4,587,445 A | 5/1986 | Kanuma ..................... 307/443 |
| 4,823,184 A | 4/1989 | Belmares-Sarabia et al. . 358/27 |
| 4,926,066 A | 5/1990 | Maini et al. ............. 307/303.1 |
| 5,295,132 A | 3/1994 | Hashimoto et al. ........... 370/13 |
| 5,315,175 A | 5/1994 | Langner ..................... 307/443 |
| 5,394,528 A | 2/1995 | Kobayashi et al. ......... 395/325 |
| 5,416,606 A | 5/1995 | Katayama et al. .......... 358/467 |
| 5,481,567 A | 1/1996 | Betts et al. ................. 375/261 |
| 5,490,252 A | 2/1996 | Macera et al. ........... 395/200.1 |
| 5,506,953 A * | 4/1996 | Dao .......................... 711/202 |
| 5,521,836 A | 5/1996 | Hartong et al. ............. 364/491 |
| 5,535,223 A | 7/1996 | Horstmann et al. ........... 371/27 |
| 5,544,203 A | 8/1996 | Casasanta et al. .......... 375/376 |
| 5,555,188 A | 9/1996 | Chakradhar ................. 364/490 |
| 5,603,056 A * | 2/1997 | Totani ........................ 711/103 |
| 5,604,450 A | 2/1997 | Borkar et al. ................. 326/82 |
| 5,617,537 A * | 4/1997 | Yamada et al. ............. 711/121 |
| 5,657,346 A | 8/1997 | Lordi et al. ................. 375/224 |
| 5,682,512 A * | 10/1997 | Tetrick ........................ 711/202 |
| 5,757,658 A | 5/1998 | Rodman et al. ............. 364/491 |
| 5,778,429 A * | 7/1998 | Sukegawa et al. .......... 711/118 |
| 5,784,706 A * | 7/1998 | Oberlin et al. .............. 711/202 |
| 5,787,268 A | 7/1998 | Sugiyama et al. .......... 395/500 |
| 5,793,259 A | 8/1998 | Chengson .................... 331/78 |

(List continued on next page.)

OTHER PUBLICATIONS

Gjessing et al.. Performance of the RamLink Memory Architecture. Proceedings HICSS'94, pp 154–162, 1994.*

(List continued on next page.)

*Primary Examiner*—Matthew Kim
*Assistant Examiner*—Woo H. Choi
(74) *Attorney, Agent, or Firm*—Schwegman, Lundberg, Woessner & Kluth, P.A.

(57) ABSTRACT

A method and apparatus for accessing memory-mapped registers that are distributed across a large integrated circuit. Some embodiments provide a method for accessing memory-mapped registers that are distributed across a first integrated circuit, the first integrated circuit including a plurality of logic subset modules, wherein each of the plurality of logic subset modules includes one or more memory-mapped registers. This method includes receiving a memory-mapped register access request into the first integrated circuit, serially transmitting, through each of the plurality of logic subset modules, a first plurality of data packets based on the memory-mapped register access request, wherein the first plurality of data packets includes an address specification for a memory-mapped register associated with a first one of the logic subset modules, and within the first logic subset module, accessing the memory-mapped register associated with the first logic subset module. Another aspect of the present invention provides an MMR circuit for accessing memory-mapped registers that are distributed across a first integrated circuit chip, the first integrated circuit chip including a plurality of logic subset modules.

22 Claims, 9 Drawing Sheets

U.S. PATENT DOCUMENTS

| | | | |
|---|---|---|---|
| 5,811,997 A | 9/1998 | Chengson et al. | 327/112 |
| 5,828,833 A | 10/1998 | Belville et al. | 395/187.01 |
| 5,844,954 A | 12/1998 | Casasanta et al. | 375/373 |
| 5,847,592 A | 12/1998 | Gleim et al. | 327/403 |
| 5,898,729 A | 4/1999 | Boezen et al. | 375/259 |
| 4,896,272 A | 6/1999 | Kurosawa | 364/491 |
| 5,910,898 A | 6/1999 | Johannsen | 364/489 |
| 5,915,104 A | 6/1999 | Miller | 395/309 |
| 6,005,895 A | 12/1999 | Perino et al. | 375/288 |
| 6,016,553 A | 1/2000 | Schneider et al. | 714/21 |
| 6,412,056 B1 * | 6/2002 | Gharachorloo et al. | 711/202 |

OTHER PUBLICATIONS

Gjessing et al. RamLink: A High–Bandwidth Point–to–Point Memory Architecture. Proceedings CompCon 1992, pp 328–331, 1992.*

Gjessing et al. A RAM link for high speed. IEEE Spectrum, pp 52–53, 1992.*

Rao, A. Memory mapped registers. [Online] news://comp.arch.embedded, Apr. 27, 1996.*

Brewer, K. Re: Memory mapped registers, May 2, 1996.*

IEEE Std 1596.4–1996, IEEE standard for high–bandwidth memory interface based on Scalable Coherent Interface (SCI) signaling technology (RamLink), 1996.*

"Low Power Quad Differential Line Driver with Cut–Off", *National Semiconductor, F100K ECL 300 Series Databook and Design Guide, pp. 2–54—2–60,* (1992).

"The SA27 library includes programmable delay elements Delaymuxo and Delaymuxn. How are these cells used?", *IBM Delaymuxn Book,* pp. 1–6, (Feb. 1999).

Djordjevic, A.R., et al., "Time Domain Response of Multiconductor Transmission Lines", *Proceedings of the IEEE, 75 (6),* 743–64, (Jun. 1987).

Im, G., et al., "Bandwidth–Efficient Digital Transmission over Unshielded Twisted–Pair Wiring"*IEEE Journal on Selected Areas in Communications, 13 (9),* 1643–1655, (Dec. 1995).

Mooney, R., et al., "A 900 Mb/s Bidirectional Signaling Scheme", *IEEE Journal of Solid–State Circuits, 30 (12),* 1538–1543, (Dec. 1995).

Takahashi, T., et al., "110GB/s Simulataneous Bi–Directional Transceiver Logic Synchronized with a System Clock", *IEEE International Solid–State Circuits Conference,* 176–177, (1999).

* cited by examiner

METHOD AND APPARATUS FOR ACCESSING MMR REGISTERS DISTRIBUTED ACROSS A LARGE ASIC

CROSS-REFERENCES TO RELATED INVENTIONS

The present invention is related to the following applications, which are filed on even date herewith, and which are incorporated herein by reference:

U.S. patent application Ser. No. 09/620,504, filed Jul. 20, 2000, titled "OPTIMIZE GLOBAL NET TIMING" (Atty. Docket No.499.072U.S. 1);

U.S. patent application Ser. No. 09/619,724, filed Jul. 20, 2000, titled "I/O IMPEDANCE CONTROLLER" (Atty. Docket No.499.073 U.S. 1);

U.S. patent application Ser. No. 09/620,629, filed Jul. 20, 2000, titled "GTL+DRIVER" (Atty. Docket No.499.075U.S. 1);

U.S. patent application Ser. No. 09/621,312, filed Jul. 20, 2000, titled "GTL+ONE-ONE/ZERO-ZERO DETECTOR" (Atty. Docket No.499.076U.S. 1);

U.S. patent application Ser. No. 09/619,771, filed Jul. 20, 2000, titled "DUAL-BANK FIFO FOR SYNCHRONIZATION OF READ DATA IN DDR SDRAM" (Atty. Docket No.499.078U.S. 1);

U.S. patent application Ser. No 09/619,459, filed Jul. 20, 2000, titled "DISCRETE DELAY LINE SYSTEM AND METHOD" (Atty. Docket No. 499.079U.S. 1);

U.S. patent application Ser. No. No 09/620,683, filed Jul. 20, 2000, titled "SYSTEM AND METHOD FOR ACCURATE ADJUSTMENT OF DISCRETE INTEGRATED CIRCUIT DELAY LINES" (Atty. Docket No. 499.080U.S. 1);

U.S. patent application Ser. No. 09/621,325, filed Jul. 20, 2000, titled "AN INTERFACE FOR SYNCHRONOUS DATA TRANSFER BETWEEN DOMAINS LOCKED AT DIFFERENT FREQUENCIES" (Atty. Docket No. 499.081U.S. 1);

U.S. patent application Ser. No. 09/920,058, filed Jul. 20, 2000, titled "METHOD AND CIRCUIT FOR RELIABLE DATA CAPTURE IN THE PRESENCE OF BUS-MASTER CHANGEOVERS" (Atty. Docket No. 499.082U.S. 1);

U.S. patent application Ser. No. 09/620,659, filed Jul. 20,2000, titled "LATENCY-ENHANCING ERROR-CORRECTION POLICY METHOD AND APPARATUS" (Atty. Docket No.499.083U.S. 1);

U.S. patent application Ser. No. 09/620,333, filed Jul. 20, 2000, titled "VARIABLE MODE BI-DIRECTIONAL AND UNI-DIRECTIONAL COMPUTER COMMUNICATION SYSTEM" (Atty. Docket No.499.084U.S. 1);

U.S. patent application Ser. No. 09/620,372, filed Jul. 20, 2000, titled "MULTIPROCESSOR SYSTEM UTILIZING MULTIPLE LINKS TO IMPROVE POINT TO POINT BANDWIDTH" (Atty. Docket No. 499.085U.S. 1);

U.S. patent application Ser. No. 09/679,851, filed Jul. 20, 2000, titled "DISTRIBUTION OF ADDRESS-TRANSLATION-PURGE REQUESTS" (Atty. Docket No.499.086U.S. 1);

U.S. patent application Ser. No. 09/620,323, filed Jul. 20, 2000, titled "METHOD AND APPARATUS FOR COMMUNICATING COMPUTER DATA FROM ONE POINT TO ANOTHER OVER A COMMUNICATIONS MEDIUM" (Atty. Docket No. 499.088U.S. 1);

U.S. patent application Ser. No. 09/620,336, filed Jul. 20, 2000, titled "SYSTEM AND METHOD FOR GENERATING CLOCK SIGNALS" (Atty. Docket No. 499.090U.S. 1);

U.S. patent application Ser. No. 09/620,338, filed Jul. 20, 2000, titled "SYNTHESIS WITH AUTOMATED PLACEMENT INFORMATION FEEDBACK" (Atty. Docket No. 499.091U.S. 1);

U.S. patent application Ser. No. 09/620,335, filed Jul. 20, 2000, titled "HEAT SINK ATTACHMENT CLIP" (Atty. Docket No. 499.093U.S. 1);

U.S. patent application Ser. No. 09/619,818, filed Jul. 20, 2000, titled "BAFFLE SYSTEM FOR AIR COOLED COMPUTER ASSEMBLY" (Atty. Docket No. 499.094U.S. 1);

U.S. Patent Application Ser. No. 09/619,725, filed Jul. 20, 2000, titled "PRINTED CIRCUIT BOARD STIFFENER" (Atty. Docket No. 499.095U.S. 1);

U.S. patent application Ser. No. 09/619,869, filed Jul. 20, 2000, titled "ASSEMBLY PROCESS AND HEAT SINK DESIGN FOR HIGH POWERED PROCESSOR" (Atty. Docket No. 499.097U.S. 1); and U.S. patent application Ser. No. 09/620,059, filed Jul. 20, 2000, titled "PRINTED CIRCUIT BOARD COMPONENT PACKAGING" (Atty. Docket No. 499.707U.S. 1).

FIELD OF THE INVENTION

This invention relates to the field of computer busses, and more specifically to a method and apparatus for accessing memory-mapped registers that are distributed across a large integrated circuit.

BACKGROUND OF THE INVENTION

Computer systems and similar electronic systems and devices are being continually required to perform more operations at faster speeds with more reliability and less power consumption. The density or number of components or elements on a chip or circuit board are being driven up while packaging size and manufacturing costs are being driven down. This presents a challenge to designers to efficiently design systems and chips that optimally utilize the available real estate on a chip or printed circuit board. Additionally, components that need to communicate with one another are desirably located near one another to improve operational efficiency, reduce power consumption and reduce metallization for interconnectons and buses. For those components that because of other constraints must be placed at other locations, the challenge is to provide efficient interconnections for accessing these components.

Thus, there is a need for a method and apparatus for accessing different elements or components that are distributed across a large integrated circuit or distributed in different locations in a system.

SUMMARY OF THE INVENTION

The present invention provides a method and apparatus for accessing memory-mapped registers that are distributed across a large integrated circuit.

One aspect of the present invention provides a method for accessing memory-mapped registers that are distributed across a first integrated circuit, the first integrated circuit including a plurality of logic subset modules, wherein each of the plurality of logic subset modules includes one or more memory-mapped registers. This method includes receiving a memory-mapped register access request into the first integrated circuit, serially transmitting, through each of the plurality of logic subset modules, a first plurality of data packets based on the memory-mapped register access request, wherein the first plurality of data packets includes an address specification for a memory-mapped register associated with a first one of the logic subset modules, and within the first logic subset module, accessing the memory-mapped register associated with the first logic subset module.

Another aspect of the present invention provides an MMR circuit for accessing memory-mapped registers that are distributed across a first integrated circuit chip, the first integrated circuit chip including a plurality of logic subset modules, the MMR circuit including a first receiver operable to receive a memory-mapped register access request into the first integrated circuit, an MMR control block within each one of the plurality of logic subset modules, and a ring controller having a serial bus connected through each of the plurality of MMR control blocks, the ring controller coupled to the first receiver and operable to generate a first plurality of data packets based on the memory-mapped register access request, wherein the first plurality of data packets includes an address specification for a memory-mapped register associated with a first one of the logic subset modules, wherein based on the address specification, the MMR control block within the first logic subset module, accesses the memory-mapped register associated with the first logic subset module.

Yet another aspect of the present invention provides a multiprocessor system having one of the MMR circuit embodiments described above. This system includes a plurality of integrated circuits including the first integrated circuit, one or more processors operably coupled to each one of the plurality of integrated circuits, a memory operably coupled to each one of the plurality of integrated circuits, and a network operably coupled to each one of the plurality of integrated circuits.

Still another aspect of the present invention provides computer system including one or more processor chips, an integrated circuit operably coupled to the one or more processor chips, the integrated circuit including a plurality of memory-mapped registers that are distributed across the integrated circuit, and means in the integrated circuit for accessing the memory-mapped registers.

BRIEF DESCRIPTION OF THE DRAWINGS

FIG. 3 shows a conventional arrangement 300 of a Hub 120. The Hub 120 contains a local block 350 with MMRs concentrated thereon.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
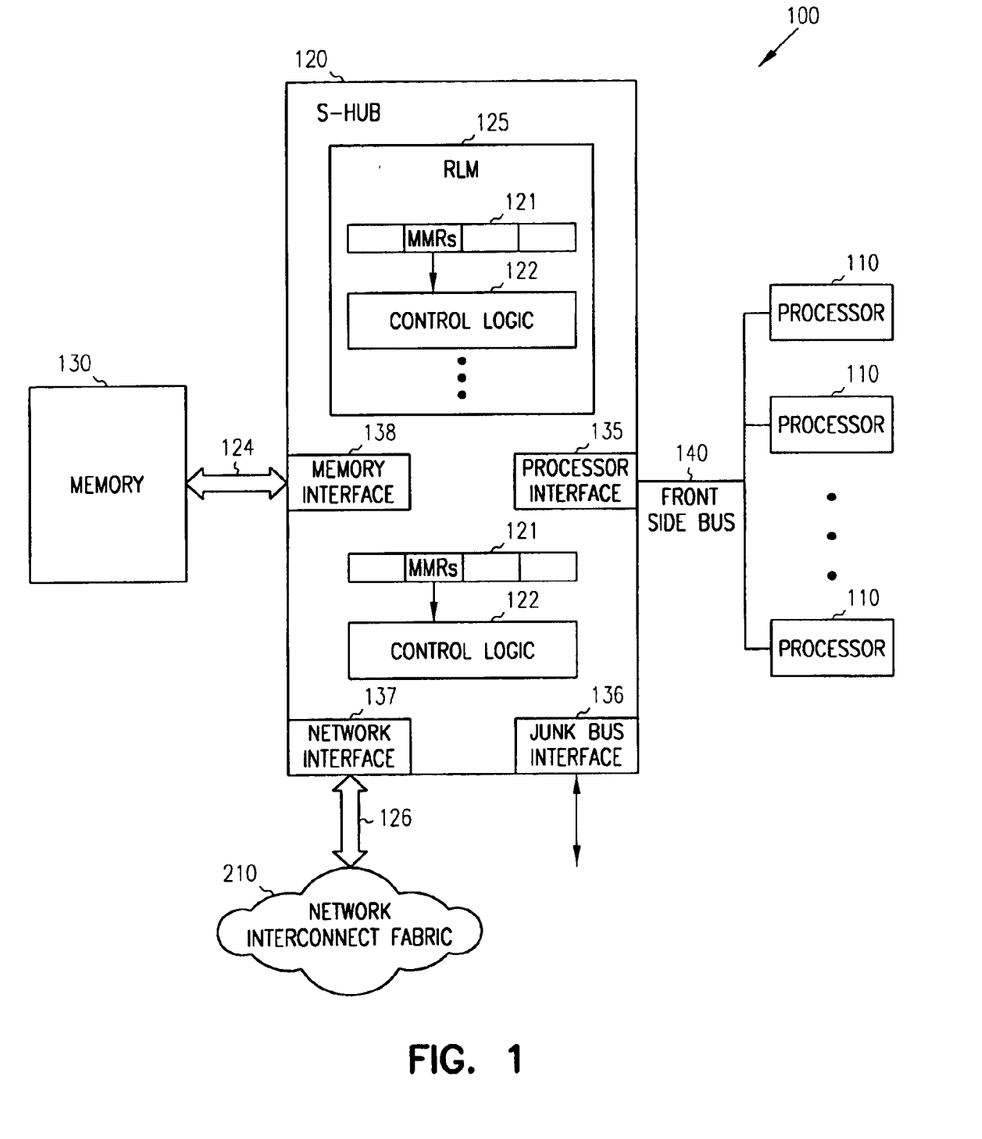
FIG. 1 shows one embodiment of the present invention having a Super Hub (SHub) 120 and a plurality of Relocatable Logic Modules (RLMs) 125.

FIG. 1 shows one embodiment of the present invention having a super hub (SHub) 120 and a plurality of relocatable logic modules (RLMs) 125. Each RLM 125 includes a set of memory mapped registers (MMRs) 121. The MMRs are coupled to and controlled by control logic 122. The SHub 120 further includes a processor interface 135, junk bus interface 136, network interface 137 and memory interface 138. The processor interface 135 is connected to a front side bus 140. The front side bus 140 in some embodiments may connect in parallel to a plurality of processors 110 for communications between the processors 110 and the RLMs or with other devices. The junk bus interface 136 may be used for diagnostics, testing and the like. The network interface 137 is connected to a network bus 126 which in turn is connected to a network interconnect fabric 210 for communication with other external devices or systems. The memory interface 138 is connected to a memory bus 124 that provides communications between the memory interface 138 of the SHub 120 and memory 130. Accordingly, all of the element, the processors 110, memory 130, RLMs, can communicate and access each other via information requests as will be described in more detail herein or these elements can access other devices or systems via the network interconnect fabric 210.

Figure 2:
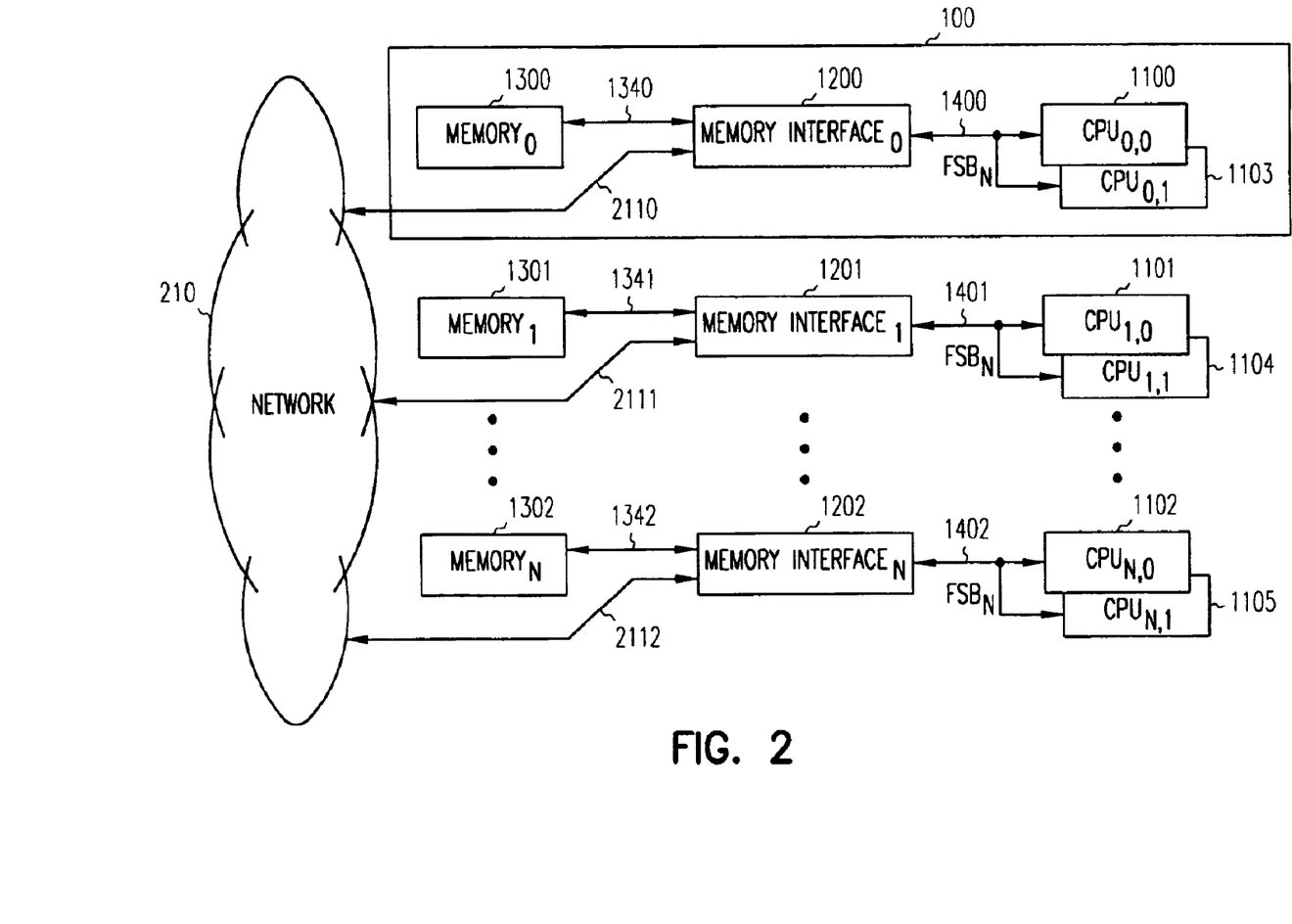
FIG. 2 shows an example for accessing data from multiple local and remote memory locations by multiple CPUs.

Referring also to FIG. 2, an example for accessing data from multiple local and remote memory locations by multiple CPUs 1100–1105 is shown. A multiplicity of CPU, memory interface and memory combinations 100 are shown. Each combination 100 includes a CPU 1100–1105 connected to a memory interface 1200–1202 by a bus 1400–1402. The memory interface 1200–1202 is connected to the memory 1300–1302 by a bus 1340–1342. The memory interface 1200–1202 is also connectable to the network by another bus 2110–2112. The CPU 1100 may then communicate with its associated memory 1300 via memory interface 1200 and local bus 1340 or may access other memories 1301, 1302 via the network and the memory interfaces and buses associated with these remote memories 1301, 1302.

Figure 3:
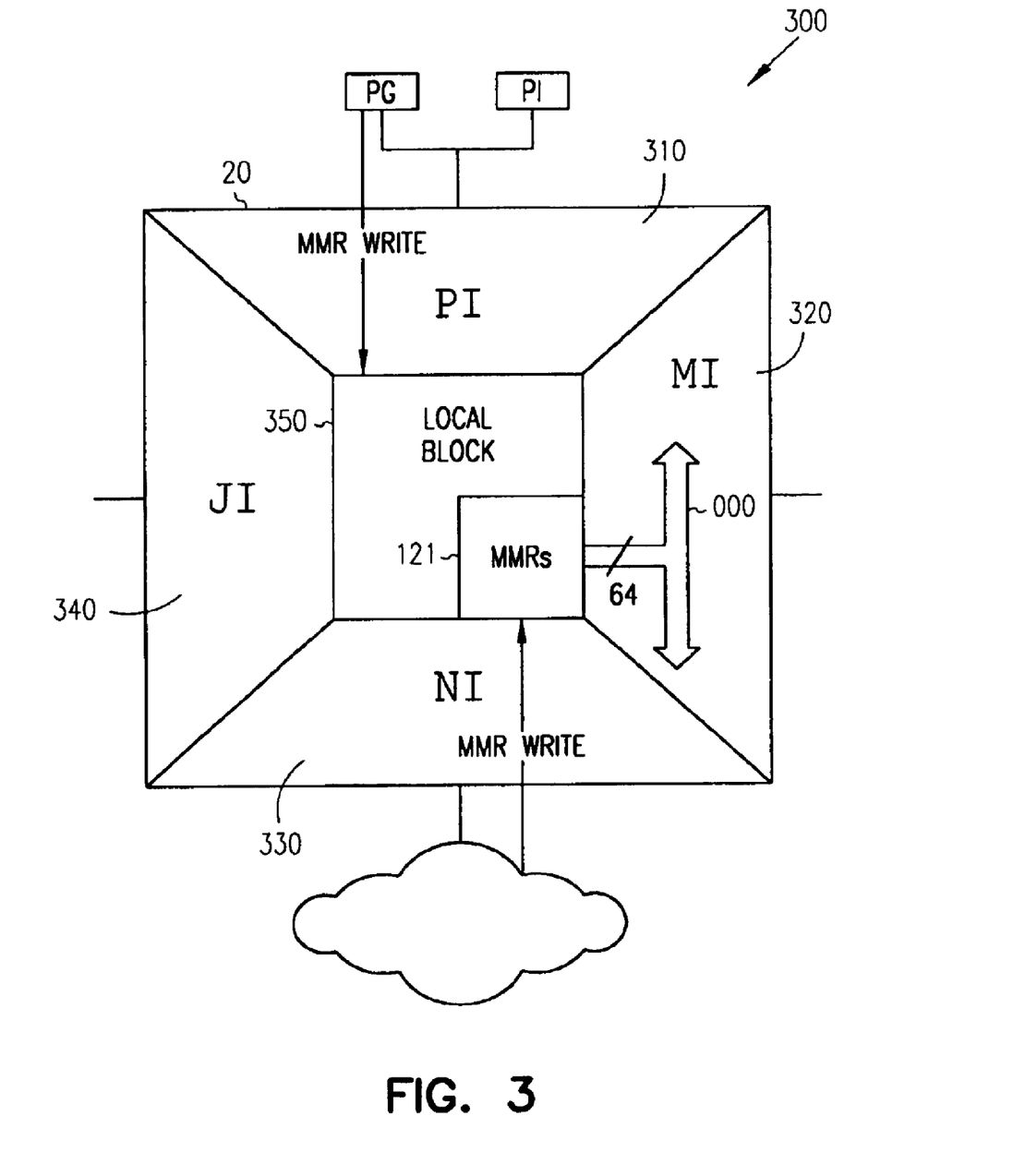

FIG. 3 shows a conventional arrangement 300 of a Hub 20. The Hub 20 contains a local block 350 with MMRs concentrated thereon. Surrounding the local block 350 is a processor interface 310, memory interface 320, network interface 330 and junk bus interface 340. The MMRs on the local block 350 communicate with any elements within the processor interface 310, memory interface 320, network interface 330 and junk bus interface 340 and with other external devices or circuits via a bus 360 which may typically be a 64 bit bus. The bus 360 is distributed about the Hub 20 and typically occupies considerable space on the chip. Additionally, an MMR 121 may be at some distance from the circuit or element with which it communicates. This may result in reduced operational efficiency, delays and possible transmission errors in addition to the disadvantages of having to make a lengthy connection between the MMR and any elements with which it communicates.

Figure 4:
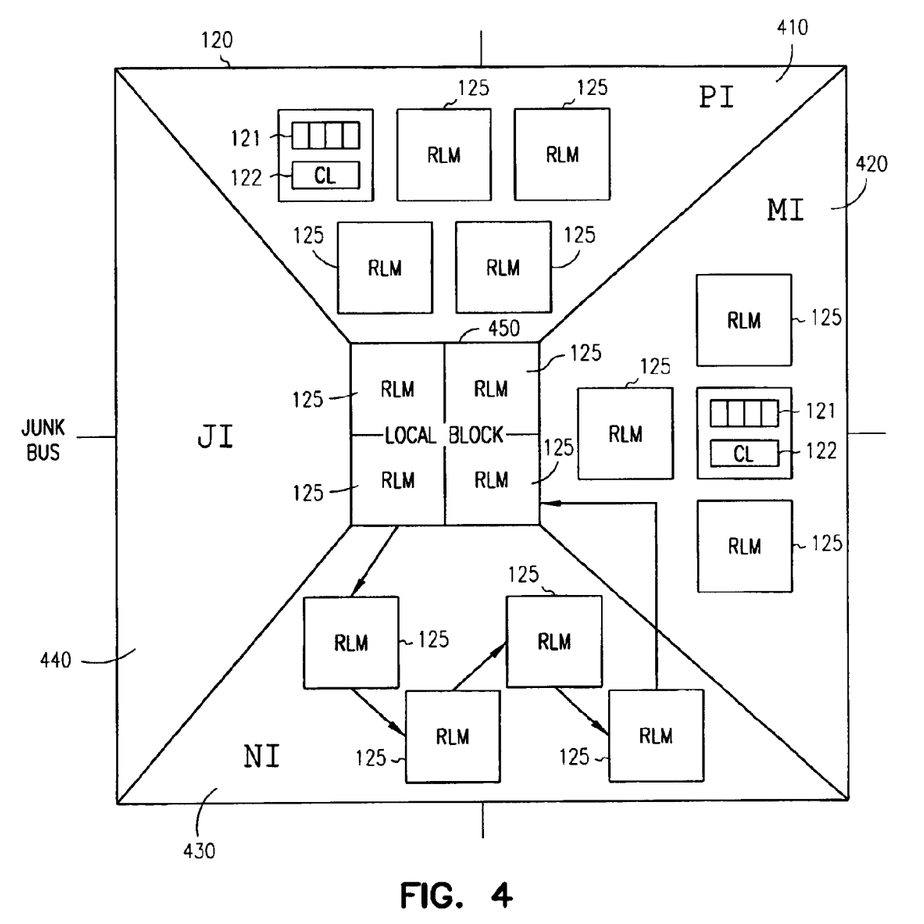
FIG. 4 shows the relocatable logic modules RLMs 125 of FIG. 1 strategically dispersed about the SHub 120 so that the RLMs are in closer proximity to the devices or circuits with which they communicate.

In one embodiment of the present invention as shown in FIG. 4, the relocatable logic modules RLMs 125 (FIG. 1) are strategically dispersed about the SHub 120 so that the RLMs 125 are in closer proximity to the devices or circuits with which they communicate. Accordingly, the memory interface 420, network interface 430, Junk bus interface 440 and processor interface 410 will all contain an appropriate number of RLMs 125 to accommodate their operational requirements. This distribution saves length interconnects, promotes operational efficiency, reduces functional delay and possible transmission errors and provides additional space on the chip for other circuitry or permits reduction in the size of the chip.

Figure 5A:
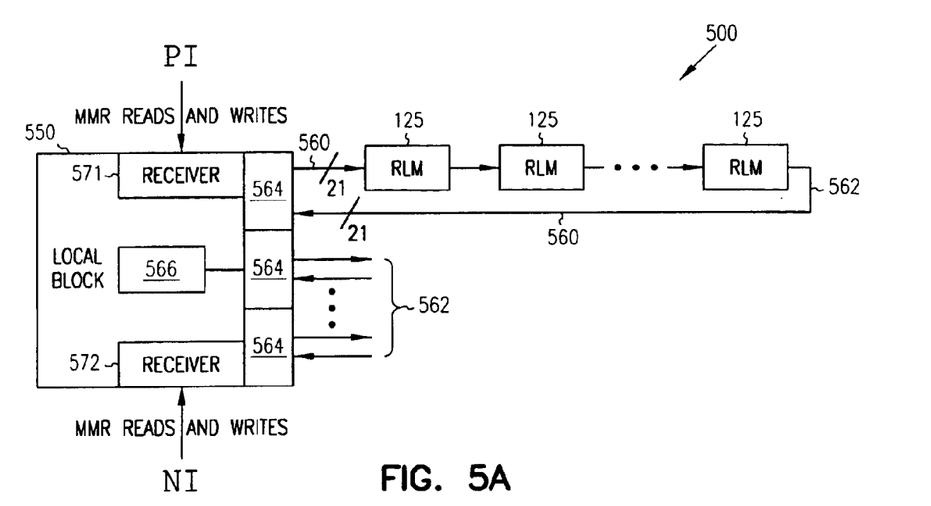
FIG. 5A shows an arrangement 500 whereby communications are accomplished with the distributed RLMs 125.

FIG. 5A shows an arrangement 500 whereby communications is accomplished with the distributed RLMs 125. The RLMs 125 are connected serial or in a ring to the local block 550 by a communications bus 560. The bus 560 is typically a 21 pin or bit bus. A ring controller 564 is connected to the serial bus 560 and to receivers 571 and 572. The ring controller 564 is operable to generate data packets from a memory-mapped register request received by one of the receivers 571 and 572. As described in more detail herein, the data packet includes an address for the specific MMR to be accessed. If the address corresponds to an MMR address in the current RLM then that specific MMR will be accessed otherwise the data packet is transmitted to the other RLMs on the serial bus to locate the specific MMR addressed. A loop controller 566 is also defined herein as one or more ring controllers 564.

Figure 5B:
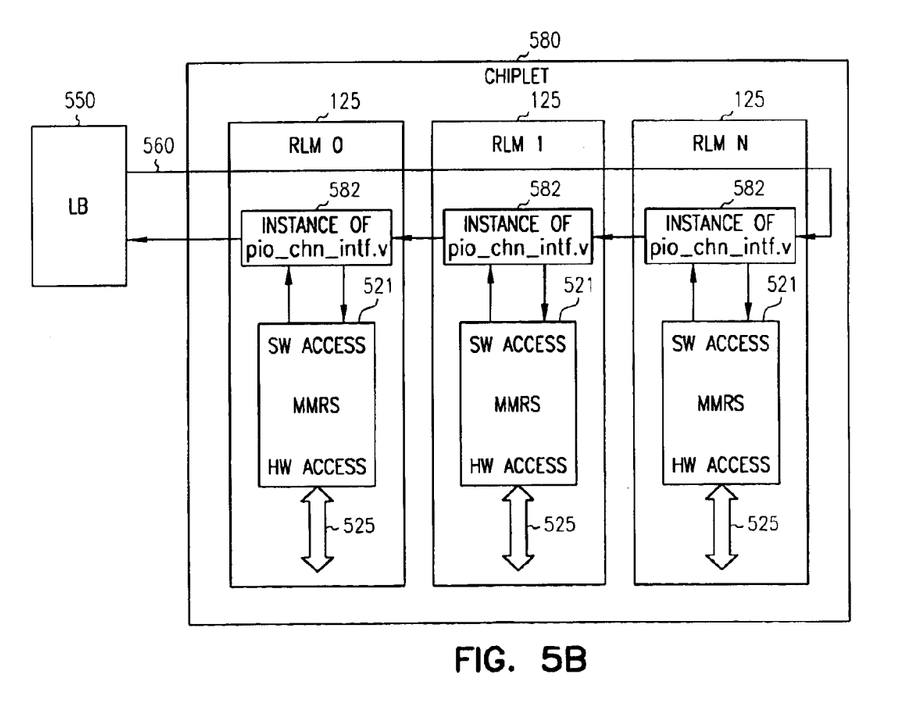
FIG. 5B shows a portion of a Shub whereby communications are accomplished within a Chiplet containing distributed RLMs 125.

FIG. 5B shows yet another embodiment of the present invention. An SHub 120 may logically be organized into 5 divisions referred to herein as chiplets:

| II: | IO Interface |
| LB: | Local Block |
| MD: | Memory/Directory |
| PI: | Processor Interface |
| XN: | Crossbar and Network Interface |

The chiplets are strictly a logical organization and do not have any real physical design presence. A single chiplet 580 is represented in FIG. 5B. Communications with the chiplet 580 is controlled via a local block 550. A plurality of RLMs 125 (RLM0, RLM1 and RLMn) are connected by a communications bus 560 in a daisy chain or ring fashion. All nodes in the ring receive MMR access requests. The pio_chn_int_intf.v 582 does not perform any address decoding or filtering. The pio_chn_int_intf.v 582 passes the request to the MMR block 521. The MMR block 521 decodes the address contained in the MMR access request and if the request corresponds to an address in the MMR block 521, the request is processed. If the address in the MMR access request does not correspond to an address in the in the particular MMR block 521, the request is simply bitbucked. Typically, each MMR block 521 will also provide hardware access ports 525 as shown in FIG. 5B. The hardware access ports 525 permit the designer to modify and/or monitor the MMRs 125 content.

Figure 6:
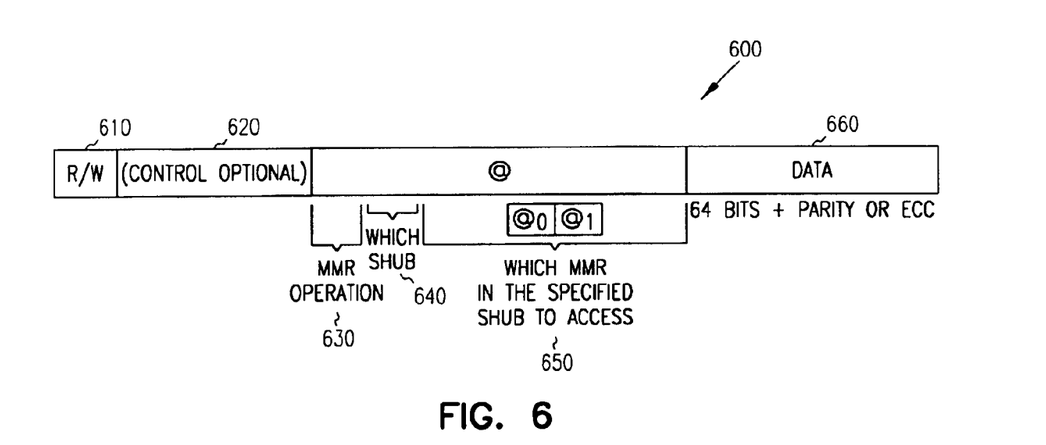
FIG. 6 shows an example of a typical message 600 for reading or writing data to or from an MMR contained within an RLM.

FIG. 6 shows an example of a typical message or packet 600 for reading or writing data to or from an MMR 121 contained within an RLM 125. A first bit or group of bits 610 will indicate an access request, typically a read/write instruction. The next group of bits 620 may contain optional control data followed by a group of bits 630 with MMR operational instructions. This is followed by address information. A set of bits 640 addressing the specific SHub 120 and a set 650 of additional bits identifying the specific MMR within the specified SHub 120 to access. The format for the MMR address may be 2 sets of 16 bits each. The address information is followed by the actual data which typically includes 64 bits plus parity and error correction coding (ECC).

Figure 7A:
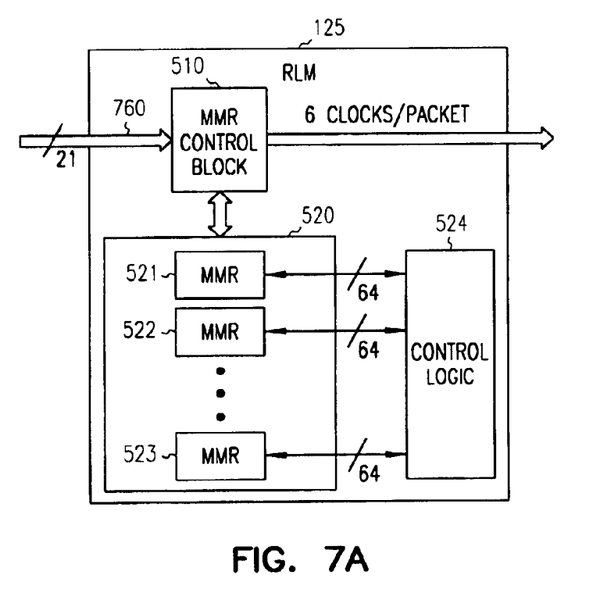
FIG. 7A is a detailed diagram of an RLM 125 and illustrates how data is read or written into an addressed MMR.

FIG. 7A is a detailed diagram of an RLM 125 and illustrates how data is read or written into an addressed MMR. The message 600 enters the RLM 125 on the 21 bit communications bus 760. The MMR control or local block 510 determines if the address information in the message 600 matches that of any of the MMRs 521–523 in this particular RLM 125. If there is no MMR address match nothing is done with the message 600 and the message or packet 600 continues to the subsequent RLMs 125 (FIG. 5A and 5B) in the series until an address match is found. If an address match is found by the MMR control block 510, the message is transferred to the addressed MMR 521, 522 or 523. Depending upon the message instructions, data is either written into the MMR or read from the MMR and transferred out on the bus 760. Control logic 524 controls the operation of the MMRs 521–523 in response to the message 600 received.

Figure 7B:
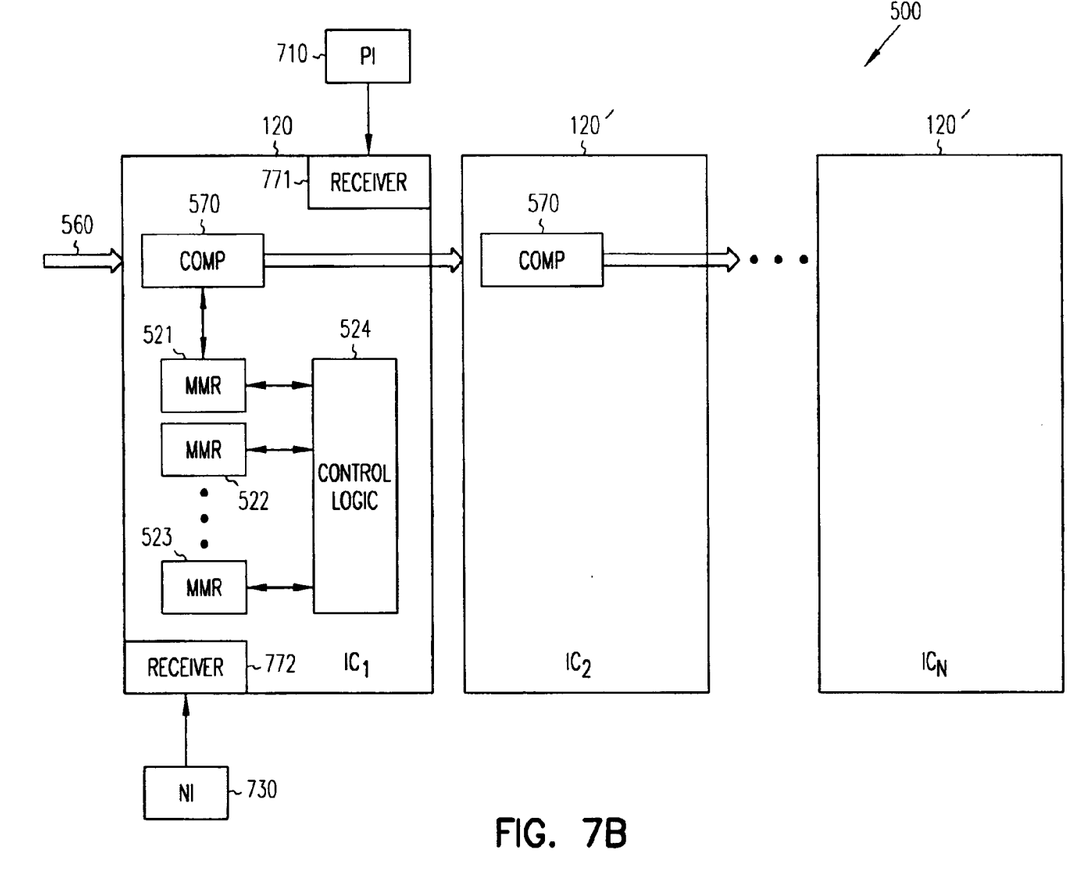
FIG. 7B is a detailed diagram of a chip 120 and illustrates how data is read and written into an addressed MMR.

FIG. 7B illustrates a further embodiment of the present invention wherein a plurality of integrated circuits 120, 120', computer systems or the like are interconnected by a bus 560 in the MMR circuit 500. The MMR circuit 500 further includes a comparator 570 that determines whether a memory-mapped request (to be described in more detail with respect to FIG. 8) is for the first integrated circuit 120 or another one of the plurality of integrated circuits 120'. In some embodiments of the present invention, the integrated circuit further includes a processor interface 710 and a network interface 730. A receiver 771 is provided and coupled to the processor interface receiver 771 and the comparator 570. Again, the comparator 570 will determine whether a memory-mapped register request 700, 800 received by the first receiver specifies the first integrated circuit 120. If so, the the integrated circuit 120 handles the request, or, if not, the request is sent to another one of the plurality of integrated circuits 120'.

Figure 8:
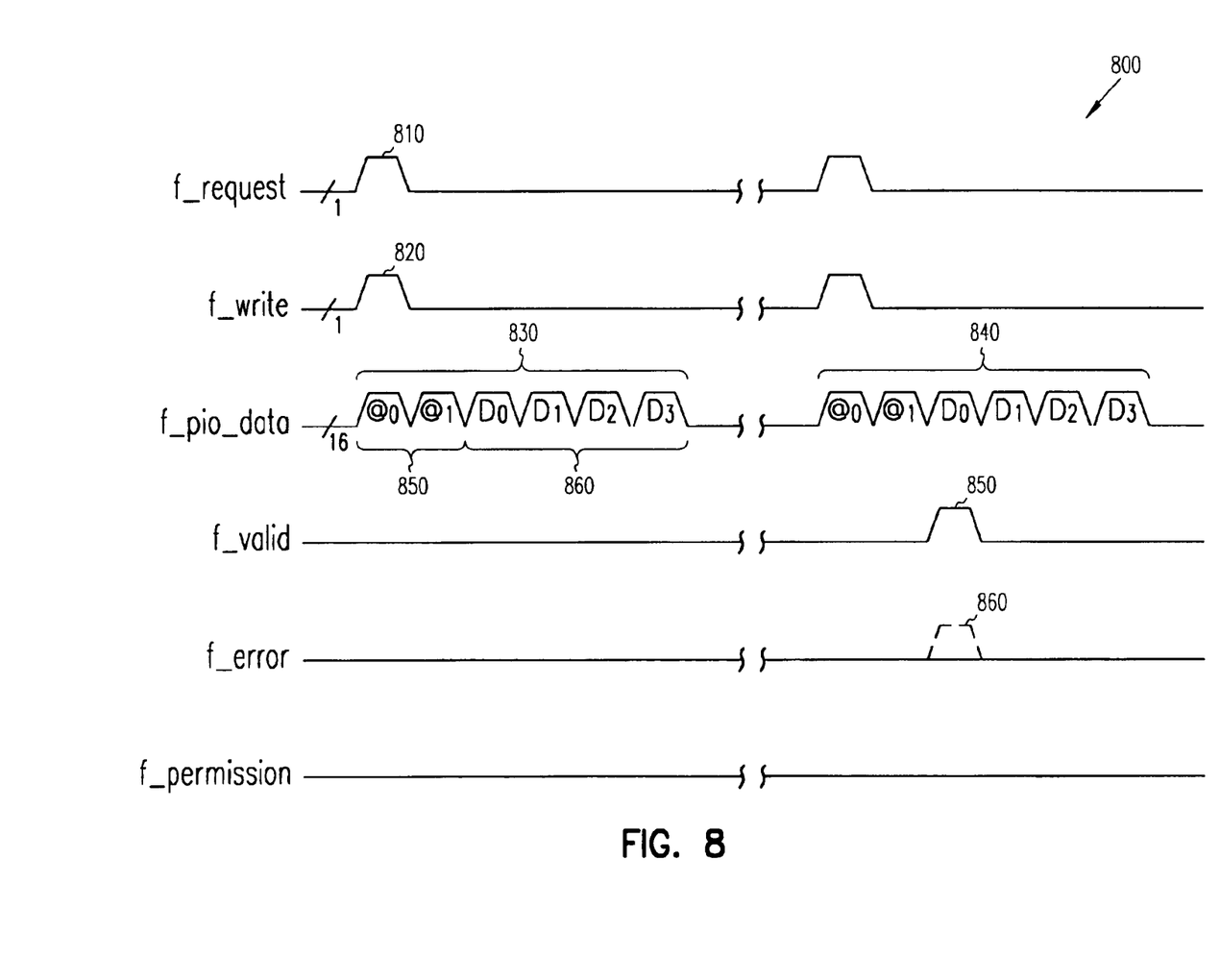
FIG. 8 illustrates interface signals 800 for a message 600 requesting data be written into an MMR.

FIG. 8 illustrates interface signals 800 for a message or packet 600 requesting data be written into an MMR. The first signal f_request goes high, pulse 810, indicating a request. Simultaneously an f_write signal is pulsed or goes high 820 indicating a write request. The f_pio_data signal is pulsed 830 representing the address and data information. If the data information is valid, at some later time a valid signal f_valid will be pulse or clocked 850 indicating an acknowledgment that the data has been successfully written into the MMR. If there is an error or some problem, then at some time later the f_error signal will be pulsed or clocked 860 which is shown in a broken line in FIG. 8 to indicate that this signal only goes high if there is an error or other problem.

Figure 9:
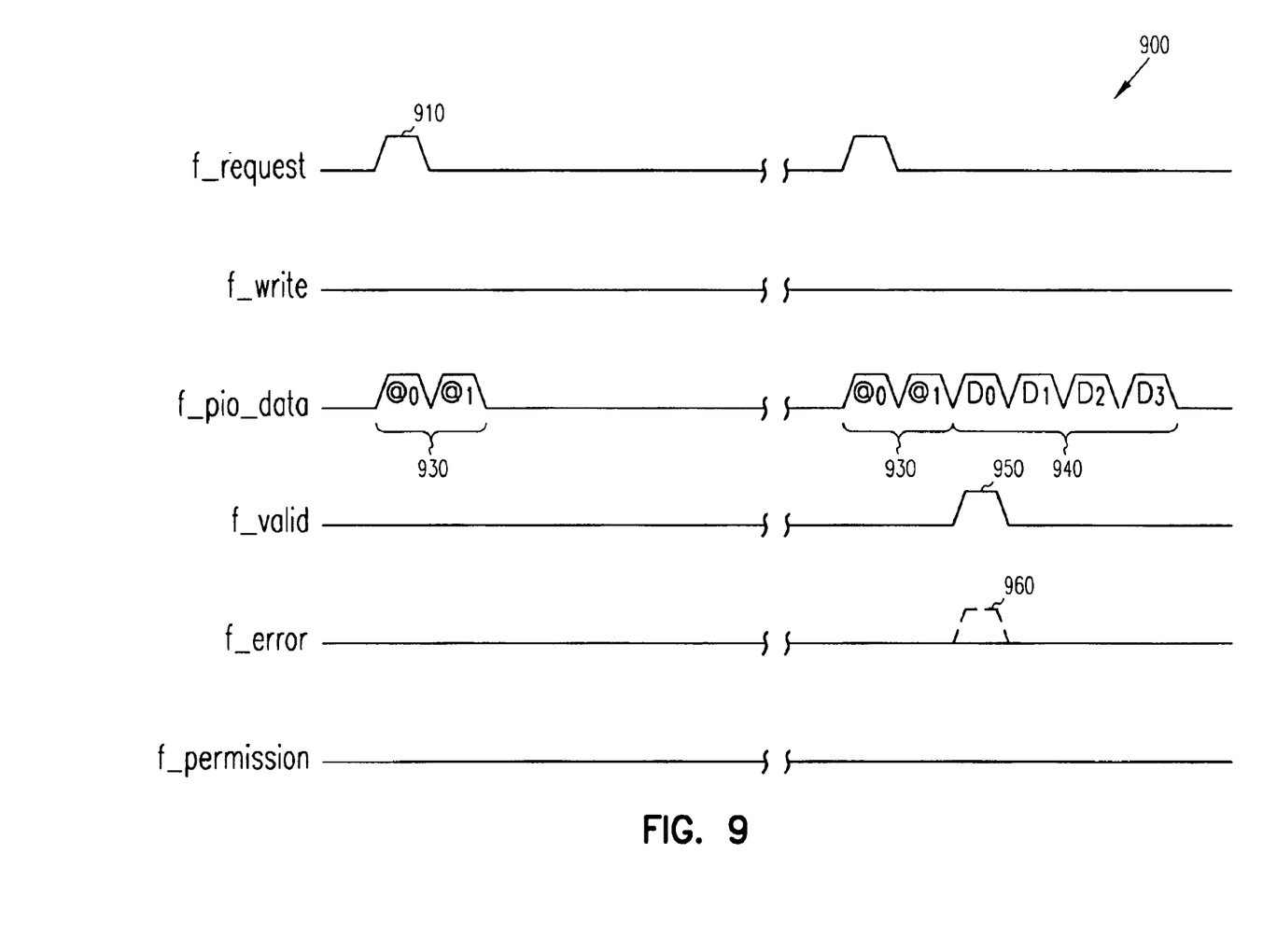
FIG. 9 illustrates interface signals 900 for a message 600 requesting that data be read from an MMR.

FIG. 9 illustrates interface signals 900 for a message 600 requesting that data be read from an MMR. The f_request signal goes high 910 indicating a request for data. Because the request is to read from an MMR, the f_write signal remains low. The f_pio_data signal is pulsed 930 representing the address information for the specific MMR from which the data is to be read. Some time later the f_pio_data signal is pulsed 940 representing the address information for the MMR and the data information read from the specific MMR. If there were no problems reading the data and all indications are that it is valid, the f_valid signal will go high or be pulsed 930. If a problem was encountered or there was some error in reading the data, at some time late the f error signal will go high or be pulsed 960 to indicate a problem or error in reading the data.

While the present invention has been described with respect to accessing MMRs 121 distributed across a large integrated circuit in an RLM 125 or the like, those skilled in the art will recognize that the method and apparatus of the present invention could be applied to any logic subset module such as an RLM or the like. A logic subset module is defined herein as any subset of any logic in an integrated circuit.

CONCLUSION

The present invention provides a method and apparatus for accessing memory-mapped registers that are distributed across a large integrated circuit.

One aspect of the present invention provides a method for accessing memory-mapped registers 121 that are distributed across a first integrated circuit 120, as shown in FIG. 1. The first integrated circuit 120 includes a plurality of logic subset modules 125 such as RLMs or the like, wherein each of the plurality of logic subset modules 125 includes one or more memory-mapped registers 121. This method includes receiving a memory-mapped register 121 access request 600, 800 (FIGS. 6, 8 and 9) into the first integrated circuit 120, serially transmitting, through each of the plurality of logic subset modules 125, a first plurality of data packets 600 based on the memory-mapped register access request 800, wherein the first plurality of data packets includes an address specification 640, 650 for a memory-mapped register 121 associated with a first one of the logic subset modules 125, and within the first logic subset module 125, accessing the memory-mapped register 121 associated with the first logic subset module 125.

In some embodiments, the memory-mapped register access request 800 is a write request 820, as shown in FIG. 8, that specifies both the address 850 of, and data 860 for, the memory-mapped register 121 associated with the first logic subset module 125, and wherein the first plurality of data packets 600 includes one or more packets having address information 640, 650 and one or more other packets having data information 660.

In some embodiments, the memory-mapped register access request 800 includes a specification of a specific one integrated circuit 120 (FIG. 7B) among a plurality of integrated circuits 120' to which the request is targeted, the method further including determining whether the memory-mapped register access request 800 specifies the first integrated circuit 120, and if not, sending the memory-mapped register access request 800 to another one of the plurality of integrated circuits 120'.

In some embodiments, the integrated circuit 120 further includes a processor interface 135, 310, 410 (See FIGS. 1, 3 and 4) and a network interface 137, 330, 430, the method further includes receiving a plurality of memory-mapped register access requests 800 from the processor interface 135, 310, 410, and handling some of the plurality of memory-mapped register access requests 800 on the integrated circuit 120, and transmitting others of the plurality of memory-mapped register access requests 800 from the network interface 137, 330, 430.

In some embodiments, the method further including receiving, from a last one of the plurality of logic subset modules 125, an indication 850, 950 (FIGS. 8 and 9) of whether the serially transmitted memory-mapped register access request 800 completed successfully, and if so, then sending an acknowledgment 850 to a source of the memory-mapped register access request 800.

In some embodiments, the memory-mapped register access request is a write request 900 that specifies both the address 930 of, and data 940 for, the memory-mapped register 521–523 (FIG. 5) associated with the first logic subset module 125, the method further including receiving, from a last one of the plurality of logic subset modules 125, the plurality of data packets 600 further including an indication of whether the serially transmitted memory-mapped register access request 900 completed successfully, and if so, then sending an acknowledgment 950 to a source of the memory-mapped register write request which may be another integrated circuit 120 or logic subset module 125.

In some embodiments, the memory-mapped register access request is a read request 900 (FIG. 9) that specifies the address of the memory-mapped register associated with the first logic subset module 125, the method further including receiving, from a last one of the plurality of logic subset modules 125, the plurality of data packets 600 further including both read data 940 and an indication 950 of whether the serially transmitted memory-mapped register access request 900 completed successfully, and if so, then sending the read data 940 to a source of the memory-mapped register read request 900 which may be another integrated circuit 120 or logic subset module 125.

In some embodiments, each of the plurality of logic subset modules 125 further includes an MMR control block 510, wherein one or more memory-mapped registers 521–523 is coupled to each MMR control block 510 (FIG. 7A), and the method further includes examining in each MMR control block 510 the plurality of packets 600 to determine whether the request 800, 900 is associated with one of its one or more memory-mapped registers 521–523, and if so, then accessing that memory-mapped register 521–523, and if not, then passing the plurality of packets 800, 900 to another control block 510.

In some embodiments, each of the plurality of logic subset modules 125 is a relocatable logic module, and wherein the plurality of relocatable logic modules are grouped into a plurality of loops 562, as shown in FIG. 5, each loop 562 including one or more MMR control blocks 510, and each loop 562 coupled to a common loop controller 566, the method further including examining the memory-mapped register access request 800, 900 in the loop controller 564, and based on the examination, passing the first plurality of data packets 600 on a selected one 562 of the plurality of loops. Common loop controller is defined herein as one or more ring controllers 564 for the individual rings or chains 560.

Another aspect of the present invention provides an MMR circuit 500 (FIG. 5A) for accessing memory-mapped registers 121 that are distributed across a first integrated circuit chip 120, the first integrated circuit chip 120 including a plurality of logic subset modules 125, the MMR circuit 500 including a first receiver 571 operable to receive a memory-mapped register access request 800, 900 into the first integrated circuit 120, an MMR control block 510 within each one of the plurality of logic subset modules 125, and a ring controller 564 having a serial bus connected through each of the plurality of MMR control blocks 510, the ring controller 564 coupled to the first receiver 571 and operable to generate a first plurality of data packets 600 based on the memory-mapped register access request 800, 900, wherein the first plurality of data packets 600 includes an address specification 650 for a memory-mapped register 521–523 associated with a first one of the logic subset modules 125, wherein based on the address specification 650, the MMR control block 510 within the first logic subset module 125, accesses the memory-mapped register 521–523 associated with the first logic subset module 125.

In some embodiments, the memory-mapped register access request 800, 900 is a write operation 820 (FIG. 8) that specifies both the address 831 of, and data 832 for, the memory-mapped register 521–523 associated with the first logic subset module 125, and wherein the first plurality of data packets 600 (FIG. 6) includes one or more packets 600 having address information 650 and one or more other packets having data information 660.

In some embodiments, the memory-mapped register access request 800, 900 includes a specification of a specific one integrated circuit 120 (FIG. 7B) among a plurality of integrated circuits 120' to which the request is targeted, wherein the MMR circuit 500 further includes a comparator 570 that determines whether the memory-mapped register access request 800, 900 specifies the first integrated circuit 120, and if not, sends the memory-mapped register access request 800, 900 to another one of the plurality of integrated circuits 120'.

In some embodiments, the integrated circuit 120 further includes a processor interface 710 (FIG. 7B) and a network interface 730, wherein the first receiver 771 is coupled to the processor interface 710, wherein the MMR circuit further includes a comparator 570 coupled to the first receiver 771 determines whether the memory-mapped register access request 800, 900 specifies the first integrated circuit 120, and if not, sends the memory-mapped register access request 800, 900 to another one of plurality of integrated circuits 120', and if so, handles the memory-mapped register access request 800, 900 on the integrated circuit 120.

In some embodiments, the MMR control block 510 of a last one of the plurality of logic subset modules 125 is coupled back to the ring controller 564, and an indication 850, 950 (FIGS. 8, 9) of whether the serially transmitted memory-mapped register access request 800, 900 completed successfully is transmitted from the MMR control block 510 of the last one of the plurality of logic subset modules 125 to the ring controller 564, and upon receipt of the indication 850, 950, the ring controller 564 sends an acknowledgment to a source, which may be another integrated circuit 120 or logic subset module 125, of the memory-mapped register access request 800, 900.

In some embodiments, the memory-mapped register access request 800, 900 is a write request 820 (FIG. 8) that specifies both the address 850 of, and data 860 for, the memory-mapped register 121 associated with the first logic subset module 125, wherein the MMR control block 510 of a last one of the plurality of logic subset modules 125 is coupled back to the ring controller 564 (FIG. 5A), and an indication 850 of whether the serially transmitted memory-mapped register write request 820 completed successfully is transmitted from the MMR control block of the last one of the plurality of logic subset modules 125 to the ring controller 564, and upon receipt of the indication, the ring circuit sends an acknowledgment 850 to a source of the memory-mapped register write request 820.

In some embodiments, the memory-mapped register access request is a read 910 request (FIG. 9) that specifies both the address 930 of, and data 940 for, the memory-mapped register 121 associated with the first logic subset module 125, wherein the MMR control block 510 of a last one of the plurality of logic subset modules 125 is coupled back to the ring controller 564, and data read from the memory-mapped register 121 associated with the first logic subset module 125 (FIG. 5A) is transmitted from the MMR control block 510 (FIG. 7A) of the last one of the plurality of logic subset modules 125 to the ring controller 564 (FIG. 5A), and upon receipt of the read data 940, the ring circuit sends the read data 940 to a source of the memory-mapped register write request 910. The source of the memory-mapped register write request 910 may be another integrated circuit 120 or logic subset module 125.

In some embodiments, each MMR control block 510 (FIG. 7A) examines the plurality of packets 600 to determine whether the request is associated with one of its one or more memory-mapped registers 520–523, and if so, then accesses that memory-mapped register 520–523, and if not, then passes the plurality of packets 600 to another control block 510.

In some embodiments, each of the plurality of logic subset modules 125 is a relocatable logic module, and wherein the plurality of relocatable logic modules are grouped into a plurality of loops 562 (FIG. 5A), each loop 562 including one or more MMR control blocks 510, and each loop 562 coupled to a common loop controller 566, the loop controller 566 operable to examine the memory-mapped register access request 800, 900, and based on the examination, to pass the first plurality of data packets 600 on a selected one 562 of the plurality of loops.

Yet another aspect of the present invention provides a multiprocessor system 100 having one of the MMR circuit embodiments described above. This system 100 includes a plurality of integrated circuits 120 (FIG. 1) including the first integrated circuit, one or more processors 110 operably coupled to each one of the plurality of integrated circuits 120, a memory 130 operably coupled to each one of the plurality of integrated circuits 120, and a network 210 operably coupled to each one of the plurality of integrated circuits 120.

Yet another aspect of the present invention provides a computer system 100 including one or more processor chips 110, an integrated circuit 120 operably coupled to the one or more processor chips 110, the integrated circuit 120 including a plurality of memory-mapped registers 121 that are distributed across the integrated circuit 121, and means 360 (FIG. 3, FIG. 5A) in the integrated circuit 120 for accessing the memory-mapped registers.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for accessing memory-mapped registers that are distributed across a first integrated circuit, the first integrated circuit including a plurality of logic subset modules, wherein each of the plurality of logic subset modules includes one or more memory-mapped registers, the method comprising:
   receiving a memory-mapped register access request into the first integrated circuit;
   serially transmitting, through each of the plurality of logic subset modules, a first plurality of data packets based on the memory-mapped register access request, wherein the first plurality of data packets includes an address specification for a memory-mapped register associated with a first one of the logic subset modules; and
   within the first logic subset module, accessing the memory-mapped register associated with the first logic subset module.

2. The method of claim 1, wherein the memory-mapped register access request is a write request that specifies both the address of, and data for, the memory-mapped register associated with the first logic subset module, and wherein the first plurality of data packets includes one or more packets having address information and one or more other packets having data information.

3. The method of claim 1, wherein the memory-mapped register access request includes a specification of a specific one integrated circuit among a plurality of integrated circuits to which the request is targeted; the method further comprising:
   determining whether the memory-mapped register access request specifies the first integrated circuit, and if not, sending the memory-mapped register access request to another one of the plurality of integrated circuits.

4. The method of claim 3, wherein the integrated circuit further includes a processor interface and a network interface; the method further comprising:
   receiving a plurality of memory-mapped register access requests from the processor interface; and
   handling some of the plurality of memory-mapped register access requests on the first integrated circuit, and transmitting others of the plurality of memory-mapped register access requests from the network interface.

5. The method of claim 1, the method further comprising:
   receiving, from a last one of the plurality of logic subset modules, an indication of whether the serially transmitted memory-mapped register access request completed successfully, and if so, then sending an acknowledgment to a source of the memory-mapped register access request.

6. The method of claim 1, wherein the memory-mapped register access request is a write request that specifies both the address of, and data for, the memory-mapped register associated with the first logic subset module, the method further comprising:
   receiving, from a last one of the plurality of logic subset modules, the plurality of data packets further including an indication of whether the serially transmitted memory-mapped register access request completed successfully, and if so, then sending an acknowledgment to a source of the memory-mapped register write request.

7. The method of claim 1, wherein the memory-mapped register access request is a read request that specifies the address of the memory-mapped register associated with the first logic subset module, the method further comprising:
   receiving, from a last one of the plurality of logic subset modules, the plurality of data packets further including both read data and an indication of whether the serially transmitted memory-mapped register access request completed successfully, and if so, then sending the read data to a source of the memory-mapped register read request.

8. The method of claim 1, wherein each of the plurality of logic subset modules further includes an MMR control block, wherein one or more memory-mapped registers is coupled to each MMR control block, and further comprising:
   examining in each MMR control block the plurality of packets to determine whether the request is associated with one of its one or more memory-mapped registers, and if so, then accessing that memory-mapped register, and if not, then passing the plurality of packets to another control block.

9. The method of claim 1, wherein each of the plurality of logic subset modules is a relocatable logic module, and wherein the plurality of relocatable logic modules are grouped into a plurality of loops, each loop including one or more MMR control blocks, and each loop coupled to a common loop controller; the method further comprising:
   examining the memory-mapped register access request in the loop controller;
   and based on the examination, passing the first plurality of data packets on a selected one of the plurality of loops.

10. An MMR circuit for accessing memory-mapped registers that are distributed across a first integrated circuit chip, the first integrated circuit chip including a plurality of logic subset modules, the MMR circuit comprising:
   a first receiver operable to receive a memory-mapped register access request into the first integrated circuit;
   an MMR control block within each one of the plurality of logic subset modules; and
   a ring controller having a serial bus connected through each of the plurality of MMR control blocks, the ring controller coupled to the first receiver and operable to generate a first plurality of data packets based on the memory-mapped register access request, wherein the first plurality of data packets includes an address specification for a memory-mapped register associated with a first one of the logic subset modules, wherein based on the address specification, the MMR control block within the first logic subset module, accesses the memory-mapped register associated with the first logic subset module.

11. The MMR circuit of claim 10, wherein the memory-mapped register access request is a write operation that specifies both the address of, and data for, the memory-mapped register associated with the first logic subset module, and wherein the first plurality of data packets includes one or more packets having address information and one or more other packets having data information.

12. The MMR circuit of claim 10, wherein the memory-mapped register access request includes a specification of a specific one integrated circuit among a plurality of integrated circuits to which the request is targeted, wherein the MMR circuit further comprises:
   a comparator that determines whether the memory-mapped register access request specifies the first integrated circuit, and if not, sends the memory-mapped register access request to another one of plurality of integrated circuits.

13. The MMR circuit of claim 10, wherein the integrated circuit further includes a processor interface and a network interface, wherein the first receiver is coupled to the processor interface, wherein the MMR circuit further comprises:

a comparator coupled to the first receiver determines whether the memory-mapped register access request specifies the first integrated circuit, and if not, sends the memory-mapped register access request to another one of plurality of integrated circuits, and if so, handles the memory-mapped register access request on the first integrated circuit.

14. The MMR circuit of claim 10, wherein the MMR control block of a last one of the plurality of logic subset modules is coupled back to the ring controller, and an indication of whether the serially transmitted memory-mapped register access request completed successfully is transmitted from the MMR control block of the last one of the plurality of logic subset modules to the ring controller, and upon receipt of the indication, a ring circuit sends an acknowledgment to a source of the memory-mapped register access request.

15. The MMR circuit of claim 10, wherein the memory-mapped register access request is a write request that specifies both the address of, and data for, the memory-mapped register associated with the first logic subset module, wherein the MMR control block of a last one of the plurality of logic subset modules is coupled back to the ring controller, and an indication of whether the serially transmitted memory-mapped register write request completed successfully is transmitted from the MMR control block of the last one of the plurality of logic subset modules to the ring controller, and upon receipt of the indication, a ring circuit sends an acknowledgment to a source of the memory-mapped register write request.

16. The MMR circuit of claim 10, wherein the memory-mapped register access request is a read request that specifies both the address of, and data for, the memory-mapped register associated with the first logic subset module, wherein the MMR control block of a last one of the plurality of logic subset modules is coupled back to the ring controller, and data read from the memory-mapped register associated with the first logic subset module is transmitted from the MMR control block of the last one of the plurality of logic subset modules to the ring controller, and upon receipt of the read data, a ring circuit sends the read data to a source of the memory-mapped register write request.

17. The MMR circuit of claim 10, wherein each MMR control block examines the plurality of packets to determine whether the request is associated with one of its one or more memory-mapped registers, and if so, then accesses that memory-mapped register, and if not, then passes the plurality of packets to another control block.

18. A multiprocessor system having the MMR circuit of claim 10, the system comprising:

a plurality of integrated circuits including the first integrated circuit;

one or more processors operably coupled to each one of the plurality of integrated circuits;

a memory operably coupled to each one of the plurality of integrated circuits; and a network operably coupled to each one of the plurality of integrated circuits.

19. The MMR circuit of claim 10, wherein each of the plurality of logic subset modules is a relocatable logic module, and wherein the plurality of relocatable logic modules are grouped into a plurality of loops, each loop including one or more MMR control blocks, and each loop coupled to a common loop controller; the loop controller operable to examine the memory-mapped register access request, and based on the examination, to pass the first plurality of data packets on a selected one of the plurality of loops.

20. A computer system comprising:

one or more processor chips;

a first integrated circuit operably coupled to the one or more processor chips, the first integrated circuit including a plurality of memory-mapped registers that are distributed across the first integrated circuit; and means in the first integrated circuit for accessing the memory-mapped registers.

21. The computer system of claim 20, wherein the means in the integrated circuit for accessing the memory-mapped registers further comprises:

means for serially transmitting, through each of the plurality of logic subset modules, a first plurality of data packets based on a memory-mapped register access request, wherein the first plurality of data packets includes an address specification for a memory-mapped register associated with a first one of the logic subset modules; and within the first logic subset module, means for accessing the memory-mapped register associated with the first logic subset module.

22. The computer system of claim 20, wherein the memory-mapped register access request includes a specification of a specific one integrated circuit among a plurality of integrated circuits to which the request is targeted; the system further comprising:

means for determining whether the memory-mapped register access request specifies the first integrated circuit, and if not, sending the memory-mapped register access request to another one of the plurality of integrated circuits.

* * * * *

UNITED STATES PATENT AND TRADEMARK OFFICE
CERTIFICATE OF CORRECTION

PATENT NO. : 6,779,072 B1 Page 1 of 1
DATED : August 17, 2004
INVENTOR(S) : Sauder et al.

It is certified that error appears in the above-identified patent and that said Letters Patent is hereby corrected as shown below:

Title page,
Item [56], References Cited, U.S. PATENT DOCUMENTS, below "4,823,184 A" insert -- 4,896,272 .......6/1990…...Kurosawa…..364/491 --.

Signed and Sealed this

Ninth Day of November, 2004

JON W. DUDAS
*Director of the United States Patent and Trademark Office*